United States Patent [19]

Ushiro et al.

[11] Patent Number: 4,812,866
[45] Date of Patent: Mar. 14, 1989

[54] PHOTOGRAPHIC FILM PACKAGE

[75] Inventors: Seimei Ushiro; Hiroshi Ohmura; Michio Cho; Tsutomu Tanaka, all of Tokyo; Yasuhiko Tanaka, Saitama; Seiji Asano, Saitama; Kazunori Ohno, Saitama, all of Japan

[73] Assignee: Fuji Photo Film Co., Ltd., Kanagawa, Japan

[21] Appl. No.: 153,714

[22] Filed: Feb. 8, 1988

[30] Foreign Application Priority Data

Feb. 6, 1987 [JP] Japan ................. 62-26132
Feb. 14, 1987 [JP] Japan ................. 62-32186

[51] Int. Cl.$^4$ ............................. G03B 17/02
[52] U.S. Cl. .................... 354/288; 354/202; 354/219; 350/432
[58] Field of Search ............ 354/202, 195.1, 199, 354/219, 288; 350/432, 482

[56] References Cited

U.S. PATENT DOCUMENTS 2,063,178  12/1936  Merte ...................... 350/432
3,205,800   9/1965  Peterson .................. 354/288
3,906,535   9/1975  Takahama et al. ..... 354/288
4,518,235   5/1985  Reed et al. ............. 354/187
4,758,852   7/1988  Maejima ................. 354/288

FOREIGN PATENT DOCUMENTS 552886  2/1958  Canada ..................... 354/288

Primary Examiner—A. A. Mathews
Attorney, Agent, or Firm—Young & Thompson

[57] ABSTRACT

A photographic film package has a taking lens, an exposure member, and a rolled film, with their associated elements, contained in a light-tight film container as a unit. The taking lens consists of either an aspherical or a spherical single-element lens preferably made of plastic material and is designed to have a focal length f and a lens speed F defined by the following conditions:

$F \geq f^2/150$ $F \geq 34.3 - 0.75f$ $F \leq 16$

16 Claims, 13 Drawing Sheets

FIG. 6 EXAMPLE I  f=33  F=8.0
(A) SPHERICAL ABERRATION
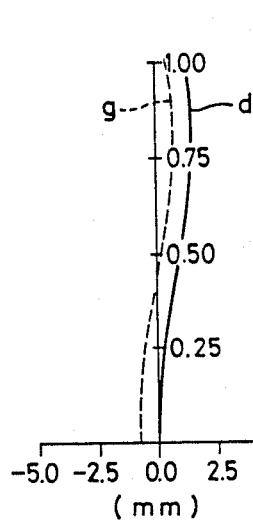
(B) ASTIGMATISM
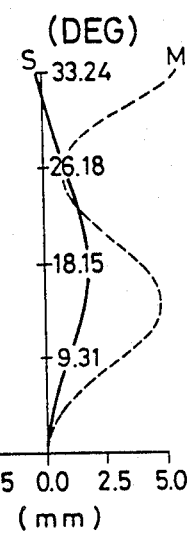
(C) CURVATURE OF FIELD
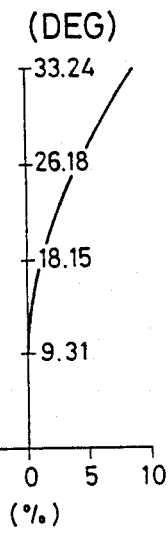
FIG. 7 EXAMPLE II  f=34  F=8.0
(A) SPHERICAL ABERRATION
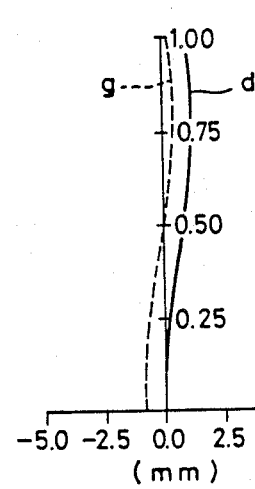
(B) ASTIGMATISM
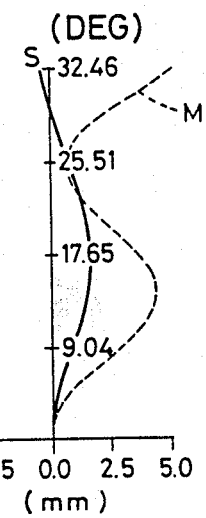
(C) CURVATURE OF FIELD
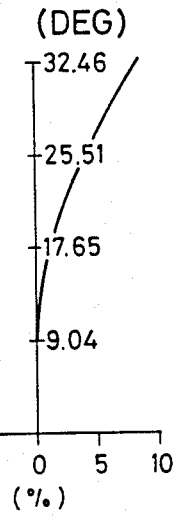

FIG. 8 EXAMPLE III  f=35  F=8.0
(A) SPHERICAL ABERRATION
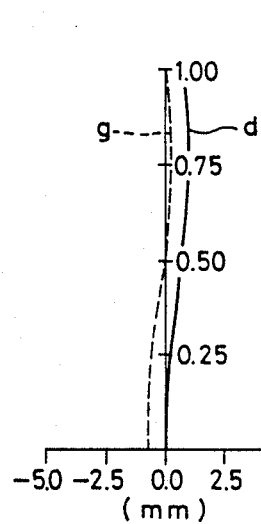
(B) ASTIGMATISM
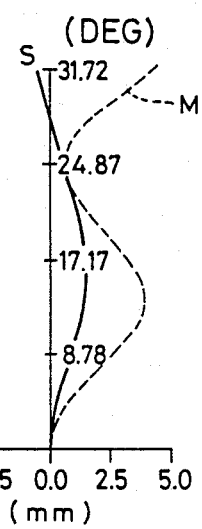
(C) CURVATURE OF FIELD
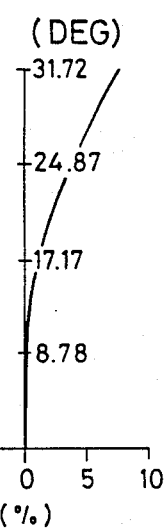
FIG. 9 EXAMPLE IV  f=36  F=8.0
(A) SPHERICAL ABERRATION
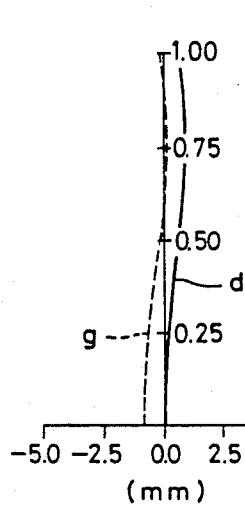
(B) ASTIGMATISM
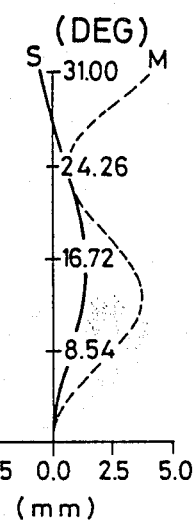
(C) CURVATURE OF FIELD
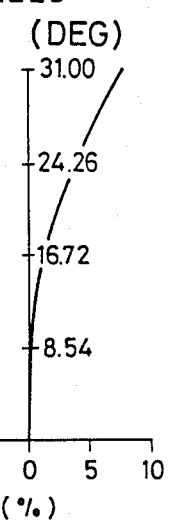

FIG. 10 EXAMPLE V  f=37  F=8.0
(A) SPHERICAL ABERRATION
(B) ASTIGMATISM
(C) CURVATURE OF FIELD
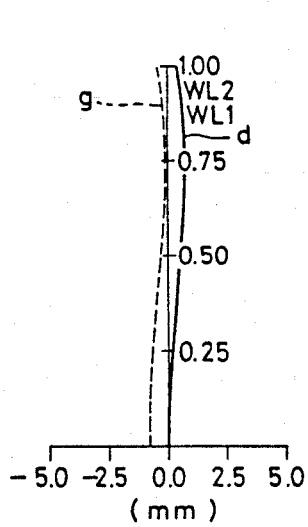
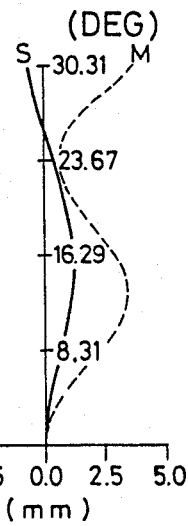
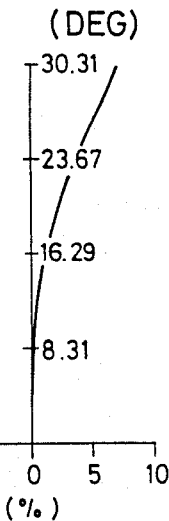
FIG. 11 EXAMPLE VI  f=38  F=8.0
(A) SPHERICAL ABERRATION
(B) ASTIGMATISM
(C) CURVATURE OF FIELD
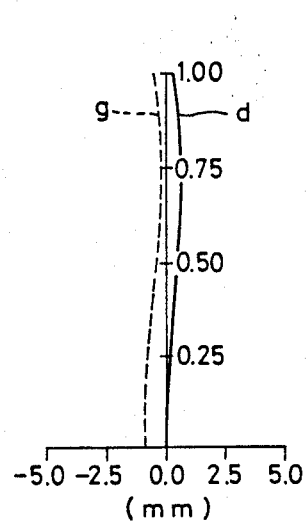
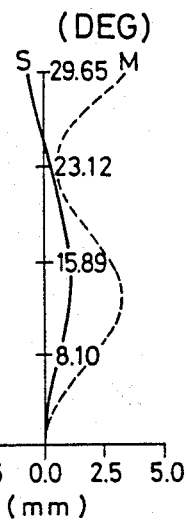
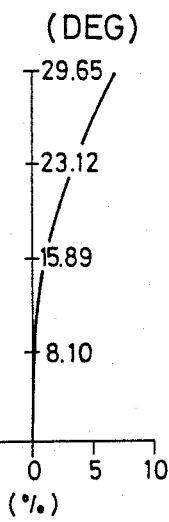

FIG. 12 EXAMPLE VII  f=39  F=8.0
(A) SPHERICAL ABERRATION
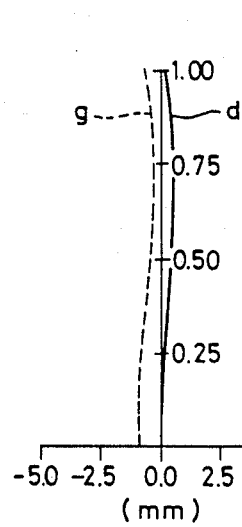
(B) ASTIGMATISM
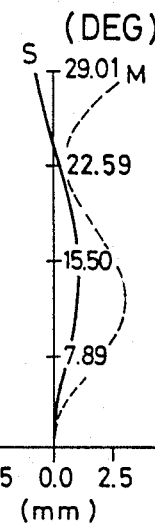
(C) CURVATURE OF FIELD
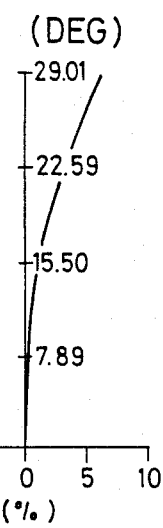
FIG. 13 EXAMPLE VIII  f=40  F=8.0
(A) SPHERICAL ABERRATION
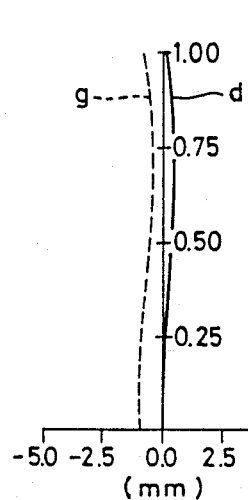
(B) ASTIGMATISM
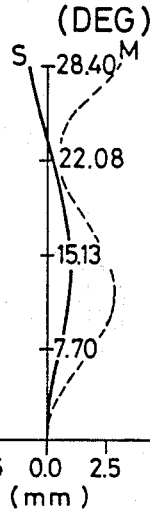
(C) CURVATURE OF FIELD
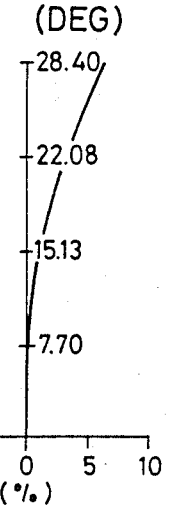

FIG. 14 EXAMPLE IX  f=33  F=8.0
(A) SPHERICAL ABERRATION
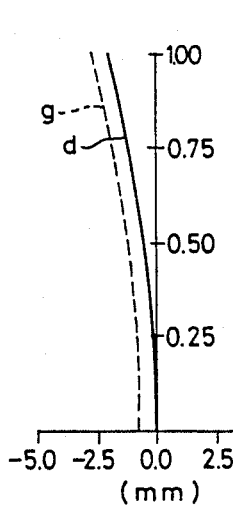
(B) ASTIGMATISM
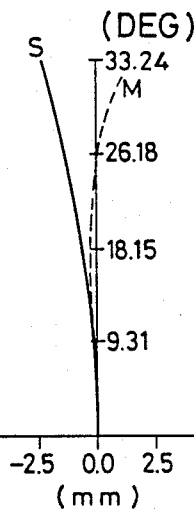
(C) CURVATURE OF FIELD
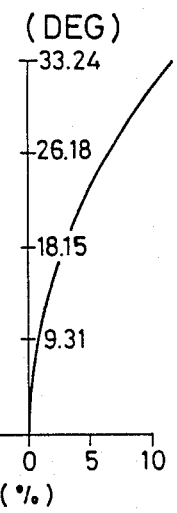
FIG. 15 EXAMPLE X  f=34  F=8.0
(A) SPHERICAL ABERRATION
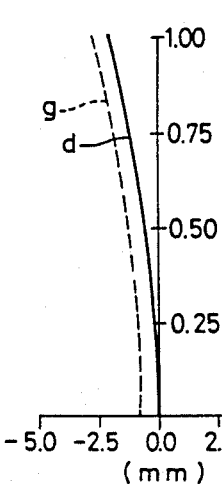
(B) ASTIGMATISM
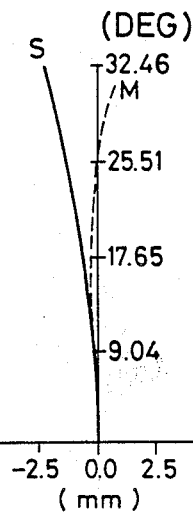
(C) CURVATURE OF FIELD
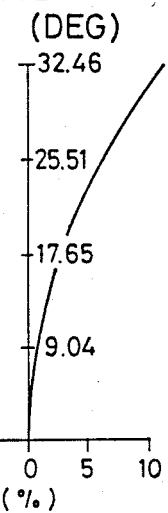

FIG. 16 EXAMPLE XI  f=35  F=8.0
(A) SPHERICAL ABERRATION
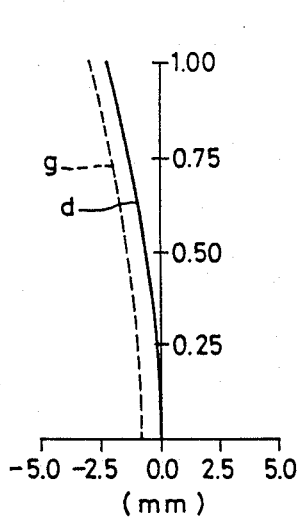
(B) ASTIGMATISM
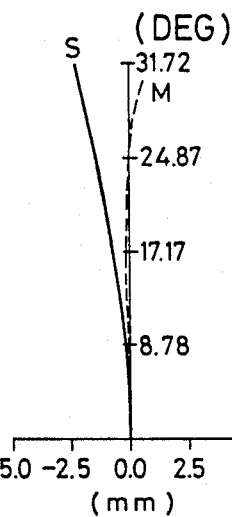
(C) CURVATURE OF FIELD
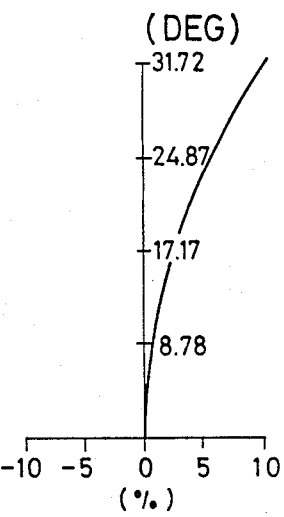
FIG. 17 EXAMPLE XII  f=36  F=8.0
(A) SPHERICAL ABERRATION
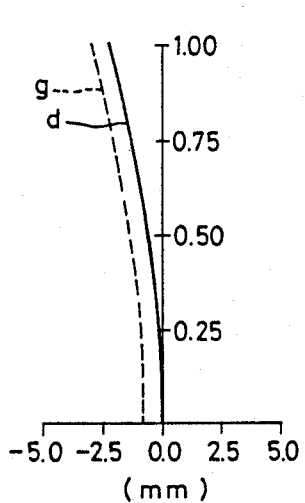
(B) ASTIGMATISM
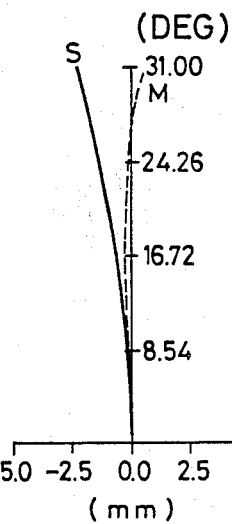
(C) CURVATURE OF FIELD
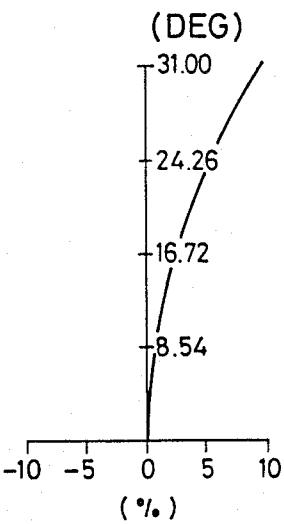

FIG. 18 EXAMPLE XIII  f=37  F=8.0
(A) SPHERICAL ABERRATION
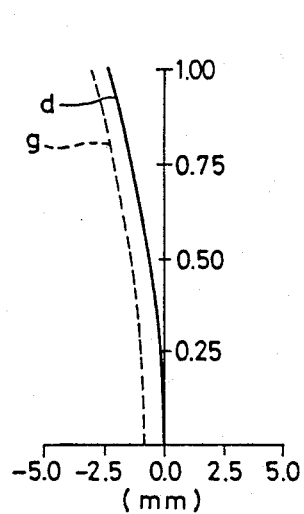
(B) ASTIGMATISM
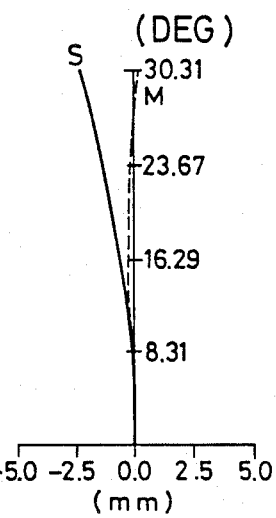
(C) CURVATURE OF FIELD
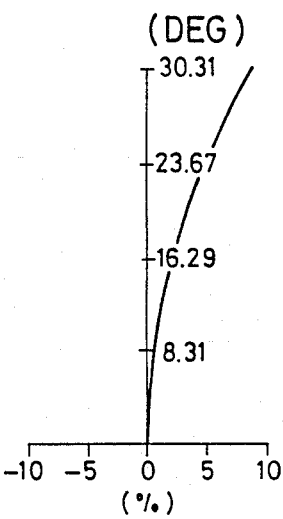
FIG. 19 EXAMPLE XIV  f=38  F=8.0
(A) SPHERICAL ABERRATION
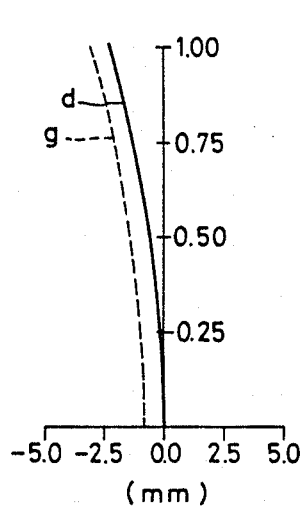
(B) ASTIGMATISM
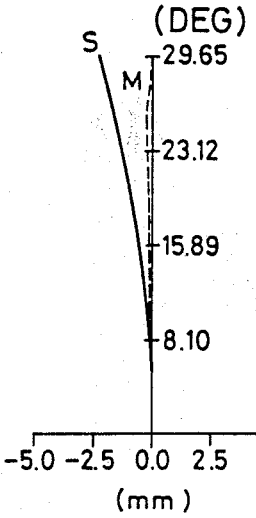
(C) CURVATURE OF FIELD
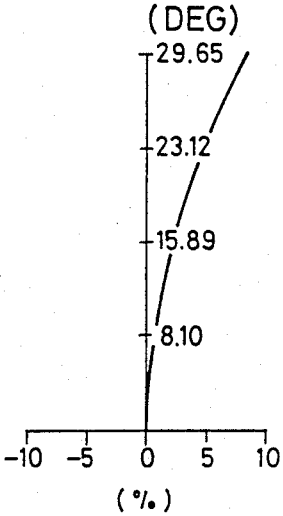

FIG. 20 EXAMPLE XV  f=39  F=8.0
(A) SPHERICAL ABERRATION
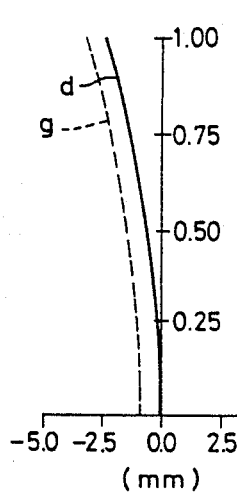
(B) ASTIGMATISM
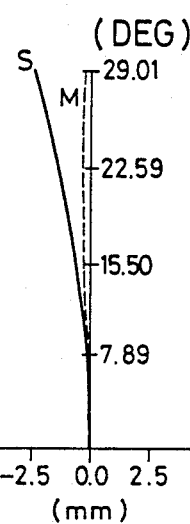
(C) CURVATURE OF FIELD
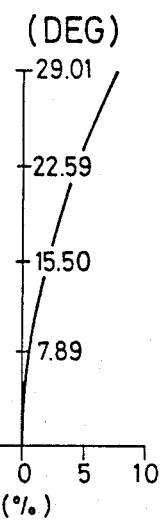
FIG. 21 EXAMPLE XVI  f=40  F=8.0
(A) SPHERICAL ABERRATION
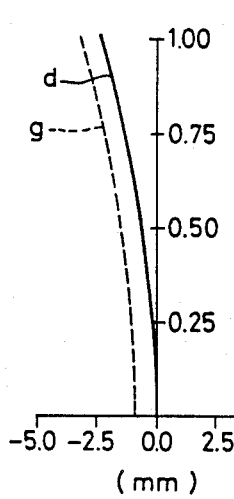
(B) ASTIGMATISM
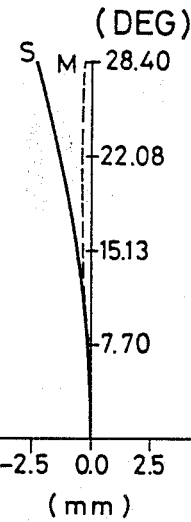
(C) CURVATURE OF FIELD
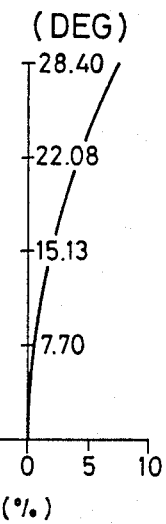

PHOTOGRAPHIC FILM PACKAGE

BACKGROUND OF THE INVENTION

The present invention relates to a photographic film package in which a photographic film, a taking lens and an exposure member, with their associated elements, are incorporated in a light-tight film casing as a unit.

A lens-fitted photographic film package can provide many opportunities for enjoyment by readily taking pictures even with no camera. This lens-fitted photographic film package comprises a light-tight film casing fitted with a taking lens, a simple exposure mechanism with includes a film winding mechanism and a shutter mechanism with their associated elements incorporated in the film casing, and a 110-size cartridge film previously packaged in the film casing, which can be sold wherever photographic film is sold. The lens-fitted photographic film, after the exposure of all frames of the film, is forwarded to a photo shop or photo laboratory without removing the film. There, the film package is opened and the exposed film is developed to make prints therefrom while the film package without the film is scrapped. The prints, together with the developed film, are returned to the customer. Such a lens-fitted single-use film package makes it easy to take pictures because there is no need for film loading and unloading.

As is well known in the art, a 110-size film cartridge contains therein a roll of 110-size film which has a sensitivity (ISO 100) sufficient to form an image with a satisfactory image quality within a certain range of brightness by using a taking lens having a focal length f of 26 mm and an F-number of 11 at a shutter speed of 1/100 sec. However, it is hard to make an enlarged print with a favorable image quality from the 110-size film. For better image quality, it has been proposed to provide a lens-fitted film package including a 135-size roll film whose image size is 36×24 mm. By incorporating the 135-size roll film contained in a film patrone defined by the International Organization for Standardization (ISO code 1007: 1979 Edition) in such a lens-fitted film package, the existing film manufacturing processes, film processing systems, printing systems can be utilized in their entireties for the lens-fitted film packages.

It is absolutely required, for such 135-size film packages, not only that they be simple and compact in construction but also that they be cheap. The film package containing a 135-size film needs a taking lens having a focal length of approximately 45 to 55 mm in order to form a normally magnified image in an image frame (24×36 mm) of the film; the provision of such a taking lens having a relatively long focal length results in making the film package bulky, in particular thick.

In order to make the film package thinner, it has hitherto been well known to those skilled in the art to provide a retractable taking lens. However, the provision of such a retractable taking lens needs to incorporate a retracting mechanism, resulting in an expensive film package.

Alternatively, one can utilize a standard taking lens having a focal length of approximately 55 mm which is used in the conventional 35 mm-size lens shutter type compact camera. However, such a standard taking lens has a plurality of lens components which includes some components having a large diameter, resulting in an expensive and bulky film package.

Another requirement for the film package is that it be simple in construction and hence low in manufacturing cost and cost of assembling. For this reason, the film package is divided into two or three unit blocks which are formed of plastic materials, namely a main body section, a front cover section and a rear cover section. Necessary elements including optical elements for a taking lens and a finder and mechanisms for exposure and film advance, with their associated elements, are incorporated in the main body section before assembling the three unit blocks.

For fitting such necessary elements made individually into the main body section, a delicate fitting operation which usually takes time is required. Therefore, it has been attempted not only to reduce the number of components of the film package but also to provide the necessary components which make assembling operations simple so as to provide a cheap film package.

OBJECT OF THE INVENTION

It is, therefore, an object of the present invention to provide a lens-fitted film package with a 135-size film, a taking lens and an exposure member incorporated in a light-tight film container as one unit.

It is another object of the present invention to provide a 135-size lens-fitted film package having a taking lens which has a high fidelity and makes the film package thinner.

It is still another object of the present invention to provide a lens-fitted film package which is cheap.

It is a further object of the present invention to provide a lens-fitted film package which consists of a reduced number of parts and therefore is manufacturable at a low cost.

SUMMARY OF THE INVENTION

According to the present invention, the above and other objects can be accomplished by providing a lens-fitted film package which is equipped with a single-element taking lens having a focal length f (mm) and an F-number satisfying the following conditions:

$$F \geq f^2/150$$

$$F \geq 34.3 - 0.75f$$

$$F \leq 16$$

By providing a taking lens satisfying the above conditions, the film package can be made thinner even though the taking lens has a focal length suitable for a 135-size film.

According to a preferred embodiment of the present invention, the single-element taking lens is made of plastic materials and is formed either integral with or separately from a front cover section. In the case that the taking lens is formed integral with the front cover section, some parts or elements heretofore needed for fitting a taking lens to the main body section can be omitted, resulting in easy assembly and a cheap film package.

BRIEF DESCRIPTION OF THE DRAWINGS

The above and other objects and features of the present invention will become apparent from the following detailed description taken in conjunction with some preferred embodiments thereof shown in the accompanying drawings in which like parts are designed by like numerals throughout the views of the drawings and wherein:

FIGS. 6 through 21 are graphs showing various aberrations of sixteen examples of taking lenses;

DETAILED DESCRIPTION OF THE INVENTION

Figure 1:
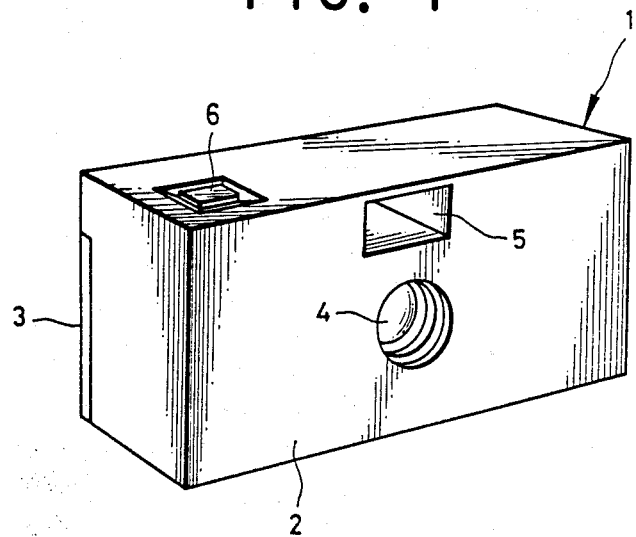
FIG. 1 is a perspective view of the lens-fitted film package of one, embodiment of the present invention.
Figure 2:
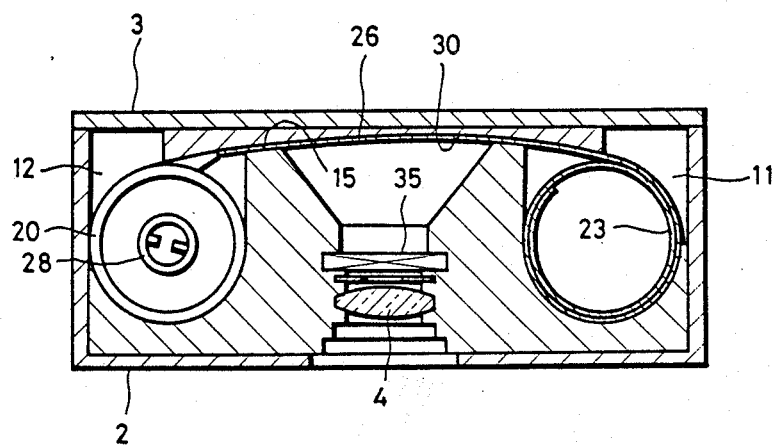
FIG. 2 is a cross-sectional view of the lens-fitted photographic film package of FIG. 1.

Referring now to FIGS. 1 and 2, shown therein is a lens-fitted photographic film package (which is hereinafter referred to as a film package for simplicity) of a preferred embodiment of the present invention. The film package 1 comprises a main front body section 2 and a back cover section 3 which form a light-tight box-shaped film container. The main front body section 2 is provided with a taking lens 4, a finder window 5, and a shutter actuating member 6 in its outer walls, and necessary photographic mechanisms such as a shutter mechanism, a film advancing mechanism, and the like incorporated therein. The back cover section 3 is fixed to the main front body section 2 in any well known manner, for example by means of ultrasonic welding, so as not to be removed by the user. The film package is preferably encased tightly in an outer casing of paper or cardboard which is formed with several openings for exposing the taking lens 4, finder window 5, and shutter actuating member 6.

Figure 3:
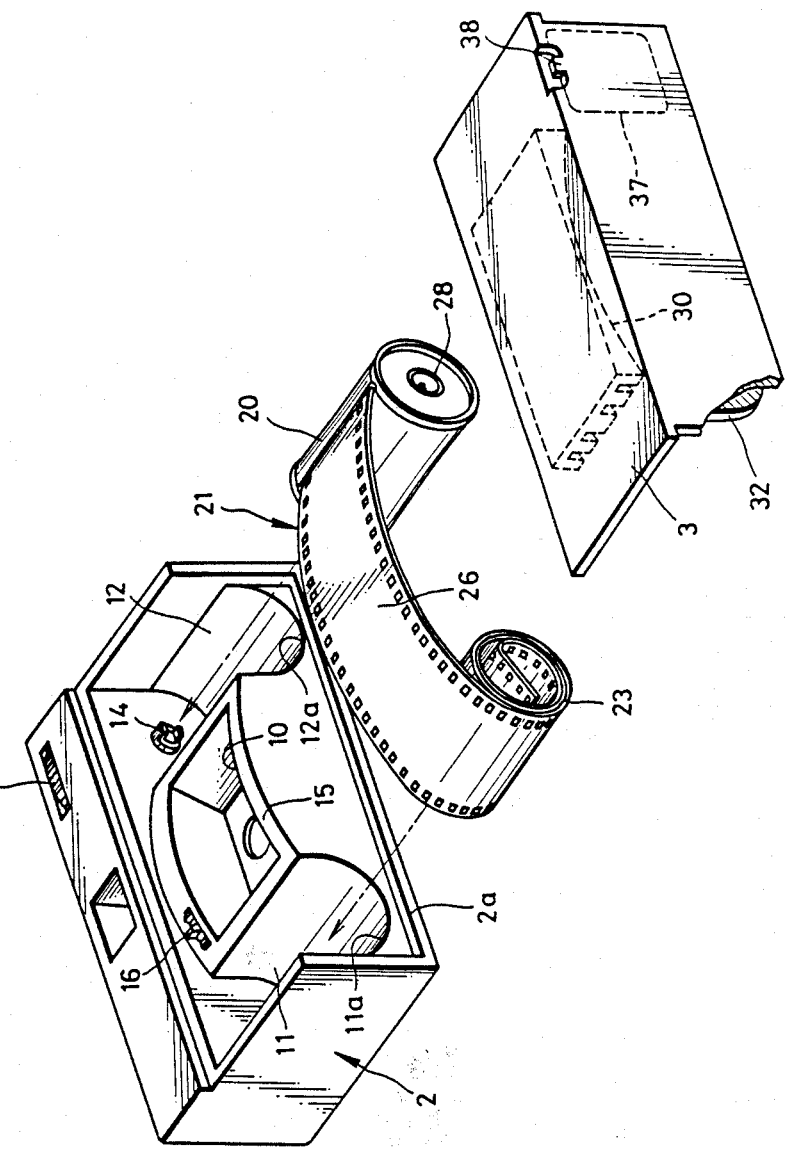
FIG. 3 is an exploded perspective view of the lens-fitted photographic film package of FIG. 1.

In FIG. 3, showing the film package disassembled into two sections, the main front body section 2 has an opening 2a extending between its back and bottom. The back cover section 3 is shaped to complementarily close the opening 2a of the main front body section 2 so as to provide the light-tight box-shaped film container. Inside the main front body section 2, there are a film roll receiving chamber 11 and a film patrone receiving chamber 12 disposed on opposite sides of an exposure frame 10. Projecting from the top wall of the film patrone receiving chamber 12 is a fork 14 which is rotatable by an external film advancing knob 8 in the counterclockwise direction as viewed in FIG. 3. The exposure frame 10 is formed with film guiding and supporting tracks 15 on both sides thereof. In one of the tracks 15, there is a sprocket wheel 16 partially projecting out of the surface.

When assembling the film package 1, a roll 23 of 135-size film 21 and a film patrone 20 in which the film 21 is held at its end by a spool 28 in the film patrone 20, are put in the receiving chambers 11, 12, respectively, prior to fixing together the two sections 2 and 3. This film 21 is of the type having 35 mm image frames, which is defined as 135 film by ISO.

The above-described film loading operation is, in this embodiment, performed by the aid of a film loading jig. In brief, the unexposed film 21 withdrawn from the film patrone 20 is wound as a film roll 23 in plural convolutions. Meanwhile, the film patrone 20 is held by the loading jig and a part of the film extending between the film roll 23 and the film patrone 20 is supported on a curve.

The film patrone 20 and the film 21 held by the loading jig can be inserted into the respective receiving chambers 11 and 12 through respective bottom openings 11a and 12a by the loading jig until the top of a spool 28 of the film patrone 20 is engaged with the fork 14. During this film loading operation, since the part 26 of film 21 is lifted, the leading edge of that part will not be caught by the teeth of the sprocket wheel 16.

Although the film roll 23 is liable to loosen due to its own curling effect, the outermost convolution of the film roll 23 is restricted by a curved wall of the film roll receiving chamber 11 to prevent the film roll 23 from loosening. Then the back cover section 3 is welded to the main front body section 2 in any well known manner, for example by ultrasonic welding.

Inside the back cover section 3, there is a back-up portion 30 shaped complementarily to the shape of the guide tracks 15 of the exposure frame 10 for pressing the film against the tracks 15 so as to place it in the focal plane of the taking lens 4. There is also a raised portion 32 formed on the bottom of the back cover section 3 which closes the opening 11a of the film roll receiving chamber 11 and supports the lower edges of the convolutions of the film roll 23. For economy, it is preferable to use a plastic single-element lens for the taking lens 4.

Film loading and film package assembly has to be done in the darkroom. The film package of this embodiment can be assembled automatically with the aid of a manipulator in cooperation with a loading jig, even in a darkroom, because of the structural simplicity thereof. Therefore, the film package can be assembled at low cost.

In using the film package thus assembled, when the shutter actuating member 6 is operated, a shutter 35 is opened and closed so as to expose a frame of the film 21 placed over the exposure frame 10. After the exposure, the film advancing knob 8 is operated to rotate the fork 14, thereby rotating the spool 28 of the patrone 20 so as to wind the film by one frame, namely to draw the exposed part of the film 21 into the patrone 20. At the same time, a new frame of the film 21 is advanced to the exposure frame 10 while rotating the sprocket 16. When the sprocket 16 makes a predetermined number of revolutions, the film advancing knob 8 and the shutter 35 with its associated elements are self-cocked so as to set the film package for the next exposure.

As the exposure is repeated in the same manner as described above, the film 21 is progressively drawn into the patrone 20. After the exposure of all frames of the film 21, the film package is forwarded to a photo shop without removing the exposed film. There, the back cover section 3 is detached from the main front body 2 by the aid of, for example, an expanding jig so as to remove the patrone containing the exposed film 21. The patrone 20 is handled in the same manner as is conventional for removing the exposed film and subjecting it to the necessary processing for development and printing.

It is desirable to provide a tab 38 which can be pulled to tear along a groove 37 by which an openable part of the bottom of the back cover 3 is defined. When the part defined by the groove 37 is torn off, an opening is provided through which the patrone 20 can be removed without detaching the back cover section 3 from the main front body section 2. Thus forming an opening in the film package makes it impossible to reuse the film package. Therefore, it will be impossible to refill a new film into the used film package container in order to reclaim a film package for reuse.

Figure 4:
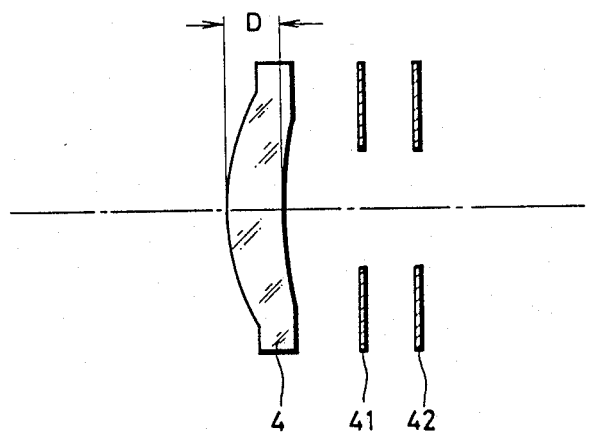
FIG. 4 is a schematic view of a taking lens system used in the lens-fitted photographic film package of FIG. 1.

FIG. 4 shows a taking lens system including the single-element taking lens 4 made of a plastic material such as acrylic resin, and first and second apertures 41 and 42 disposed behind the taking lens 4. The taking lens 4 is designed to have a focal length between 33 and 40 mm. As is well known in the art, the F-number of the taking lens system is determined based on the apertures 41 and 42. In this embodiment, the taking lens system has an F-number which satisfies the following conditions:

$$F \geq f^2/150 \quad \ldots (1)$$

$$F \geq 34.3 - 0.75f \quad \ldots (2)$$

$$F \leq 16 \quad \ldots (3)$$

wherein f is the focal length of the taking lens 4. As long as the taking lens system satisfies the conditions (1), (2) and (3), an image with a satisfactory image quality can be obtained even though the taking lens system consists of a fixed focus single-element lens.

More specifically, condition (1) should be satisfied in order that the taking lens system can form an acceptable circle of confusion having a diameter smaller than 0.05 mm for a point at a distance farther than approximately 1500 mm. The hyper-focal distance H is found by:

$$H = f^2/cF$$

wherein C is the diameter of the acceptable circle of confusion. Also, the closest subject distance D is found by:

$$D = f^2/2cF$$

As a result, the F-number is found by using the following equation:

$$F = f^2/2cD$$

As will be apparent from the above, the taking lens system should satisfy condition (1) for the requirements that the diameter of the acceptable circle of confusion c be smaller than 0.05 mm, and the intended closest subject distance be 1500 mm from the taking lens.

Condition (2) is based on MTF tables which will be described in connection with several examples of the taking lens system for resolution of a marginal image formed by the taking lens system. For example, for taking lens systems needing to have resolutions of approximately 27 lines per mm at the image center and approximately 11 lines per mm at margins, it is enough, if the lenses are made of glass, to have MTF values of at least about 20% for the center and margins. However, in the case of plastic lenses which are relatively hard to make without manufacturing error and have a relatively large surface reflectivity, the plastic lens have to be designed to have a MTF value of more than 30% in order to achieve the same resolution.

Figure 5:
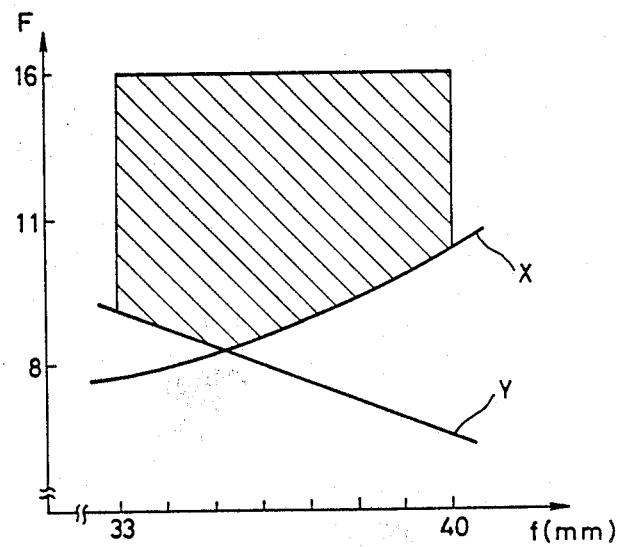
FIG. 5 is a graph showing the relationship between the focal length f and the F-number of the taking lens system of FIG. 4.

Condition (3) provides a practical F-number based on the film and shutter speeds. As a practical matter, effective F-numbers are found in an area which is defined by conditions (1) to (3) and is shaded in FIG. 5. In FIG. 5, X shows the relationship between the f and F-numbers for a diameter of the circle of confusion of 0.05 and Y shows the relationship between the f and F-numbers for a resolution of 11 lines per mm for marginal image. As long as conditions (1), (2) and (3) are satisfied, the taking lens system, even though consisting of a single-element plastic taking lens 4, provides a satisfactory lens performance.

Several examples will now be described in detail. In each example, a single-element plastic taking lens 4 of the taking lens system has a front (object side) aspherical surface. In each table showing numerical data, i, R, D, $N_d$, and $\nu d$ are the surface number from the object side, the radius of curvature of that surface, the thickness of the lens, the refractive index, and the Abbe number, respectively. The aspherical surface indicated by *1 through *8 may be defined by the following equation:

$$Z = \frac{CY^2}{1 + \{1 - (1+k)C^2Y^2\}^{\frac{1}{2}}} + a_1Y^4 + a_2Y^6 + a_3Y^8 + a_4Y^{10}$$

where Z is the surface sag at a semi-aperture distance Y from the axis of the lens, and C, k, $a_1$, $a_2$, $a_3$, and $a_4$ are aspherical coefficients.

Aberrations of the taking lens system for the following Examples I to VIII are shown in FIGS. 6 to 13.

EXAMPLE I f = 33 mm   F = 8

| i | R | D | Nd | νd |
|---|---|---|---|---|
| 1 | *1 |  | 1.494757 | 57.5 |
|   |   | 2.3679 |   |   |
| 2 | 10.7557 |   |   |   |
|   |   | 1.9339 |   |   |
| 1st Aperture (φ = 3.8000) | | | | |
|   |   | 1.0000 |   |   |
| 2nd Aperture (φ = 3.3527) | | | | |
| Aspherical Coefficients | | | | |

C = 0.14413578
k = −0.477370
$a_1$ = −5.47510 × 10$^{-4}$
$a_2$ = 9.10545 × 10$^{-5}$
$a_3$ = −5.14738 × 10$^{-6}$
$a_4$ = 1.11811 × 10$^{-7}$

EXAMPLE II f = 34 mm   F = 8

| i | R | D | Nd | νd |
|---|---|---|---|---|
| 1 | *2 |  | 1.494757 | 57.5 |
|   |   | 2.4298 |   |   |
| 2 | 11.1276 |   |   |   |
|   |   | 2.1703 |   |   |
| 1st Aperture (φ = 4.0000) | | | | |
|   |   | 1.0000 |   |   |
| 2nd Aperture (φ = 3.4354) | | | | |
| Aspherical Coefficients | | | | |

C = 0.13962566
k = −0.461891
$a_1$ = −4.31041 × 10$^{-4}$
$a_2$ = 6.77186 × 10$^{-5}$
$a_3$ = −3.49734 × 10$^{-6}$

-continued

EXAMPLE II $a_4 = 6.96944 \times 10^{-8}$

EXAMPLE III $f = 35 \text{ mm} \quad F = 8$

| i | R | D | Nd | νd |
|---|---|---|---|---|
| 1 | *3 | | 1.494757 | 57.5 |
| | | 2.4884 | | |
| 2 | 11.5081 | | | |
| | | 2.4066 | | |
| | 1st Aperture ($\phi = 4.0000$) | | | |
| | | 1.0000 | | |
| | 2nd Aperture ($\phi = 3.5178$) | | | |

Aspherical Coefficients $C = 0.13534861$
$k = -0.523034$
$a_1 = -2.54139 \times 10^{-4}$
$a_2 = 4.08760 \times 10^{-5}$
$a_3 = -1.82112 \times 10^{-6}$
$a_4 = 3.17942 \times 10^{-8}$

EXAMPLE IV $f = 36 \text{ mm} \quad F = 8$

| i | R | D | Nd | νd |
|---|---|---|---|---|
| 1 | *2 | | 1.494757 | 57.5 |
| | | 2.5026 | | |
| 2 | 11.8708 | | | |
| | | 2.617 | | |
| | 1st Aperture ($\phi = 4.2000$) | | | |
| | | 1.0000 | | |
| | 2nd Aperture ($\phi = 3.6063$) | | | |

Aspherical Coefficients $C = 0.13158231$
$k = -0.523034$
$a_1 = -2.54139 \times 10^{-4}$
$a_2 = 4.08760 \times 10^{-5}$
$a_3 = -1.82112 \times 10^{-6}$
$a_4 = 3.17942 \times 10^{-8}$

EXAMPLE V $f = 37 \text{ mm} \quad F = 8$

| i | R | D | Nd | νd |
|---|---|---|---|---|
| 1 | *2 | | 1.494757 | 57.5 |
| | | 2.5620 | | |
| 2 | 12.3236 | | | |
| | | 2.9157 | | |
| | 1st Aperture ($\phi = 4.2000$) | | | |
| | | 1.0000 | | |
| | 2nd Aperture ($\phi = 3.6884$) | | | |

Aspherical Coefficients $C = 0.12737582$
$k = -0.517579$
$a_1 = -1.95633 \times 10^{-4}$
$a_2 = 3.07536 \times 10^{-5}$
$a_3 = -1.25317 \times 10^{-6}$
$a_4 = 2.01612 \times 10^{-8}$

EXAMPLE VI $f = 38 \text{ mm} \quad F = 8$

| i | R | D | Nd | νd |
|---|---|---|---|---|
| 1 | *6 | | 1.494757 | 57.5 |
| | | 2.5764 | | |
| 2 | 12.7886 | | | |
| | | 3.2000 | | |
| | 1st Aperture ($\phi = 4.4000$) | | | |
| | | 1.0000 | | |
| | 2nd Aperture ($\phi = 3.7758$) | | | |

Aspherical Coefficients $C = 0.12350647$
$k = -0.542557$
$a_1 = -1.53998 \times 10^{-4}$
$a_2 = 2.50140 \times 10^{-5}$
$a_3 = -9.62722 \times 10^{-7}$
$a_4 = 1.46987 \times 10^{-8}$

EXAMPLE VII $f = 39 \text{ mm} \quad F = 8$

| i | R | D | Nd | νd |
|---|---|---|---|---|
| 1 | *7 | | 1.494757 | 57.5 |
| | | 2.6340 | | |
| 2 | 13.2849 | | | |
| | | 3.4671 | | |
| | 1st Aperture ($\phi = 4.4000$) | | | |
| | | 1.0000 | | |
| | 2nd Aperture ($\phi = 3.8577$) | | | |

Aspherical Coefficients $C = 0.11959821$
$k = -0.538383$
$a_1 = -1.19707 \times 10^{-4}$
$a_2 = 1.93618 \times 10^{-5}$
$a_3 = -6.88647 \times 10^{-7}$
$a_4 = 9.78497 \times 10^{-9}$

EXAMPLE VIII $f = 40 \text{ mm} \quad F = 8$

| i | R | D | Nd | νd |
|---|---|---|---|---|
| 1 | *8 | | 1.494757 | 57.5 |
| | | 2.6486 | | |
| 2 | 13.8405 | | | |
| | | 3.7743 | | |
| | 1st Aperture ($\phi = 4.6000$) | | | |
| | | 1.0000 | | |
| | 2nd Aperture ($\phi = 3.9441$) | | | |

Aspherical Coefficients $C = 0.11578548$
$k = -0.555125$
$a_1 = -9.48602 \times 10^{-5}$
$a_2 = 1.58222 \times 10^{-5}$
$a_3 = -5.31102 \times 10^{-7}$
$a_4 = 7.14642 \times 10^{-9}$ In the above examples, at a particular distance $y = 0.3/C$, each surface sag Z is as follows:

| | |
|---|---|
| Example I | $Z = -0.00812$ |
| Example II | $Z = -0.00757$ |
| Example III | $Z = -0.00701$ |
| Example IV | $Z = -0.00664$ |
| Example V | $Z = -0.00626$ |
| Example VI | $Z = -0.00604$ |
| Example VII | $Z = -0.00578$ |
| Example VIII | $Z = -0.00566$ |

In consideration of various aberrations shown in FIGS. 6 to 13, it is preferred that the surface sag Z satisfy the following condition:

$$-0.20 < Z < 0$$

If the lower limit is exceeded, curvature of the field in the meridian image area is excessively corrected although distortions are well corrected; and if the upper limit is exceeded, distortions and curvature of the field cannot be corrected properly. As is well known, the radius of curvature of a reference spherical surface is $1/C$.

The following Table I shows MTF and distortion values (%) of the taking lens systems of Examples I through VIII necessary to satisfy, in spatial frequency, 27 lines/mm at the image center and 11 lines/mm at the margins when the film is placed in a flat focal plane.

TABLE I

| f | | F/8 | F/11 | F/16 | DST |
|---|---|---|---|---|---|
| 33 mm | Center | 26 | 52 | 67 | 8.7 |
| | Margin (S/M) | 23/54 | 82/65 | 77/64 | |
| 34 mm | Center | 35 | 55 | 67 | 8.3 |
| | Margin (S/M) | 30/43 | 81/66 | 80/64 | |
| 35 mm | Center | 44 | 60 | 67 | 7.9 |
| | Margin (S/M) | 33/53 | 79/71 | 82/66 | |
| 36 mm | Center | 47 | 65 | 67 | 7.4 |
| | Margin (S/M) | 33/58 | 77/74 | 83/68 | |
| 37 mm | Center | 52 | 68 | 68 | 7.1 |
| | Margin (S/M) | 32/58 | 70/73 | 84/86 | |
| 38 mm | Center | 54 | 72 | 68 | 6.7 |
| | Margin (S/M) | 33/59 | 74/74 | 86/70 | |
| 39 mm | Center | 57 | 73 | 68 | 6.4 |
| | Margin (S/M) | 35/60 | 73/76 | 86/71 | |
| 40 mm | Center | 57 | 75 | 84 | 6.1 |
| | Margin (S/M) | 35/61 | 72/77 | 53/53 | |

In Table I, S and M represent sagittal image surface and meridian image surface, respectively, and DST is the distortion.

The taking lens 4 may have spherical surfaces on both sides, as is shown by the following Examples IX through XVI.

Aberrations of the taking lens system are shown in FIGS. 14 to 21 for the respective examples.

EXAMPLE IX $f = 33$ mm $F = 8$

| i | R | D | Nd | νd |
|---|---|---|---|---|
| 1 | 6.2203 | | 1.494757 | 57.5 |
| | | 2.3514 | | |
| 2 | 8.8296 | | | |
| | | 1.3232 | | |
| 1st Aperture ($\phi = 3.8000$) | | | | |
| | | 1.0000 | | |
| 2nd Aperture ($\phi = 3.3344$) | | | | |

EXAMPLE X $f = 34$ mm $F = 8$

| i | R | D | Nd | νd |
|---|---|---|---|---|
| 1 | 6.4101 | | 1.494757 | 57.5 |
| | | 2.3915 | | |
| 2 | 9.1172 | | | |
| | | 1.4968 | | |
| 1st Aperture ($\phi = 4.0000$) | | | | |
| | | 1.0000 | | |
| 2nd Aperture ($\phi = 3.4287$) | | | | |

EXAMPLE XI $f = 35$ mm $F = 8$

| i | R | D | Nd | νd |
|---|---|---|---|---|
| 1 | 6.5867 | | 1.494757 | 57.5 |

-continued
EXAMPLE XI

| | | | | |
|---|---|---|---|---|
| | | 2.3942 | | |
| 2 | 9.3904 | | | |
| | | 1.7001 | | |
| 1st Aperture ($\phi = 4.0000$) | | | | |
| | | 1.0000 | | |
| 2nd Aperture ($\phi = 3.5262$) | | | | |

EXAMPLE XII $f = 36$ mm $F = 8$

| i | R | D | Nd | νd |
|---|---|---|---|---|
| 1 | 6.7919 | | 1.494757 | 57.5 |
| | | 2.4317 | | |
| 2 | 9.7190 | | | |
| | | 1.8761 | | |
| 1st Aperture ($\phi = 4.2000$) | | | | |
| | | 1.0000 | | |
| 2nd Aperture ($\phi = 3.6221$) | | | | |

EXAMPLE XIII $f = 37$ mm $F = 8$

| i | R | D | Nd | νd |
|---|---|---|---|---|
| 1 | 6.9857 | | 1.494757 | 57.5 |
| | | 2.4305 | | |
| 2 | 10.0386 | | | |
| | | 2.0686 | | |
| 1st Aperture ($\phi = 4.2000$) | | | | |
| | | 1.0000 | | |
| 2nd Aperture ($\phi = 3.7211$) | | | | |

EXAMPLE XIV $f = 38$ mm $F = 8$

| i | R | D | Nd | νd |
|---|---|---|---|---|
| 1 | 7.2060 | | 1.494757 | 57.5 |
| | | 2.4633 | | |
| 2 | 10.4073 | | | |
| | | 2.2650 | | |
| 1st Aperture ($\phi = 4.4000$) | | | | |
| | | 1.0000 | | |
| 2nd Aperture ($\phi = 3.8189$) | | | | |

EXAMPLE XV $f = 39$ mm $F = 8$

| i | R | D | Nd | νd |
|---|---|---|---|---|
| 1 | 7.4199 | | 1.494757 | 57.5 |
| | | 2.4608 | | |
| 2 | 10.7790 | | | |
| | | 2.4851 | | |
| 1st Aperture ($\phi = 4.4000$) | | | | |
| | | 1.0000 | | |
| 2nd Aperture ($\phi = 3.9184$) | | | | |

EXAMPLE XVI $f = 40$ mm $F = 8$

| i | R | D | Nd | νd |
|---|---|---|---|---|
| 1 | 7.6525 | | 1.494757 | 57.5 |
| | | 2.4899 | | |
| 2 | 11.1820 | | | |
| | | 2.6643 | | |
| 1st Aperture ($\phi = 4.6000$) | | | | |

-continued

| EXAMPLE XVI |
| --- |
| 1.0000 |
| 2nd Aperture ($\phi = 4.0177$) |

MTF and distortion values (%) that the taking lens system of each example is required to satisfy, in spatial frequency, 27 lines/mm at the image center and 11 lines/mm at the margins and when the film is placed a flat focal plane, are shown in Table II.

TABLE II

| f | | F/8 | F/11 | F/16 | DST |
| --- | --- | --- | --- | --- | --- |
| 33 mm | Center | 19 | 33 | 69 | 11.7 |
| | Margin (S/M) | 19/52 | 33/77 | 40/80 | |
| 34 mm | Center | 19 | 34 | 68 | 10.9 |
| | Margin (S/M) | 19/55 | 34/80 | 39/81 | |
| 35 mm | Center | 20 | 35 | 69 | 10.1 |
| | Margin (S/M) | 20/57 | 35/80 | 41/80 | |
| 36 mm | Center | 20 | 35 | 68 | 9.4 |
| | Margin (S/M) | 20/55 | 35/82 | 38/82 | |
| 37 mm | Center | 21 | 32 | 68 | 8.7 |
| | Margin (S/M) | 21/53 | 32/81 | 35/76 | |
| 38 mm | Center | 22 | 33 | 68 | 8.2 |
| | Margin (S/M) | 22/48 | 33/81 | 36/75 | |
| 39 mm | Center | 21 | 33 | 68 | 7.7 |
| | Margin (S/M) | 21/45 | 33/81 | 36/74 | |
| 40 mm | Center | 21 | 34 | 69 | 7.3 |
| | Margin (S/M) | 21/43 | 34/78 | 37/72 | |

In the 1st through 8th examples wherein an aspherical lens is utilized as the single-element taking lens and the film is placed in a flat focal plane, upon progressively decreasing the focal length of the taking lens system 4 to values less than about 32 mm, curvatuve of the field becomes more than 9% and distortions of the image become increasingly noticeable. Therefore, it is preferred to use a taking lens having a focal length greater than about 32 mm. On the other hand, when using any one of the spherical single-element taking lenses for the taking lens system shown by the examples IX to XVI, if the focal length is less than about 39 mm and the film is placed in a flat focal plane, the distortion exceeds 9%. However, because the curved back-up portion 30 (see FIG. 3) helps to reduce distortion, it is preferred to use a spherical single-lens taking lens having a focal length greater than about 33 mm. To reduce the thickness of the film package, it is preferred to use a taking lens having a focal length less than about 40 mm.

If the F-number, which depends on the combination of the taking lens 4 and the first and second apertures 41 and 42, is too large, artificial illumination is needed even though the film has a high speed, for example ISO 400; or a slower shutter speed could be used, but with increased risk of blurring. To avoid the use of artificial illumination and/or a slow shutter speed, it is preferred to use a taking lens having an F-number of 16 by which object brightnesses between exposure values EV 10 and 16 can be handled by the film.

The single-element taking lens 4 may be formed integrally with and as a part of the light-tight film package in order not only to manufacture the film package at a low cost but also to assemble it with ease.

Figure 22:
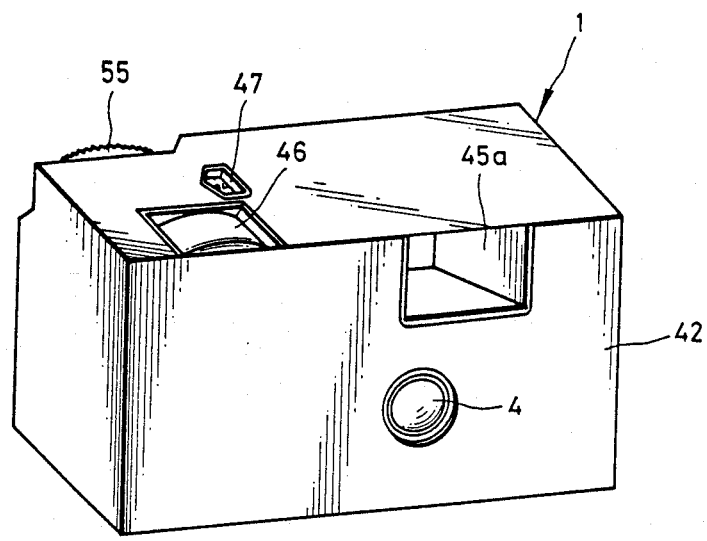
FIG. 22 is a perspective view of the lens-fitted film package of another preferred embodiment of the present invention.
Figure 23:
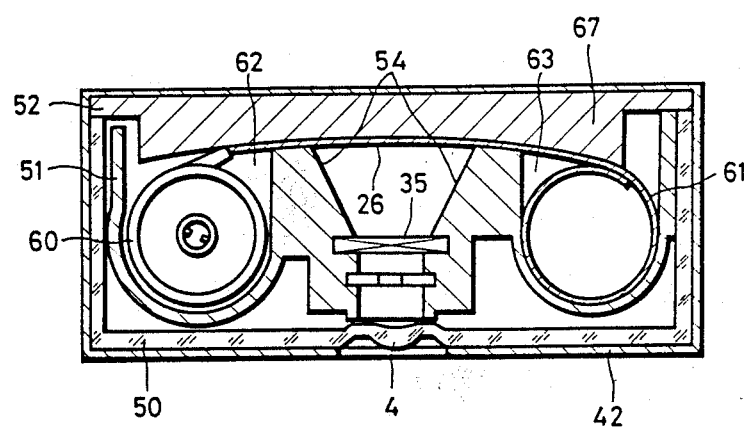
FIG. 23 is a cross-sectional view of the lens-fitted film package of FIG. 22.
Figure 24:
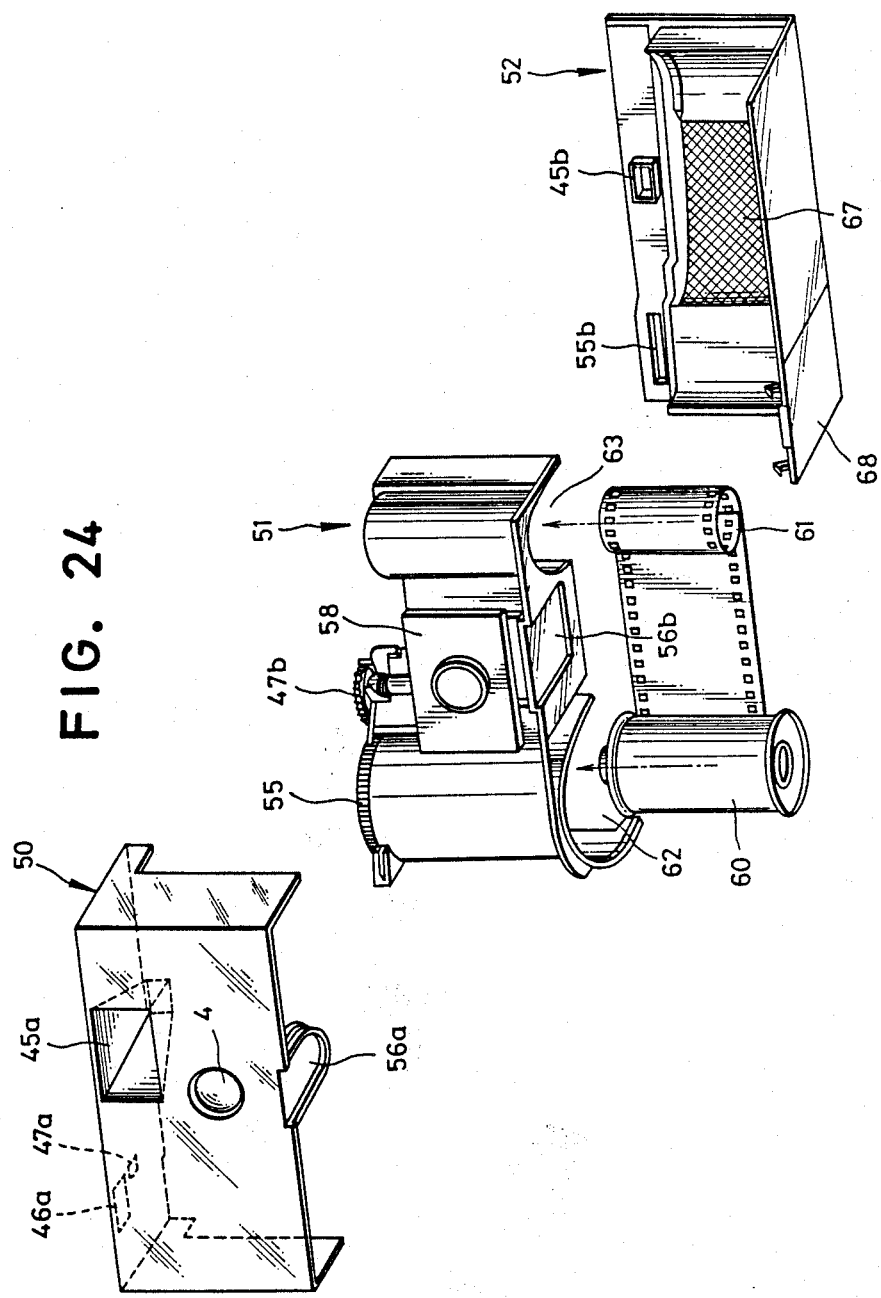
FIG. 24 is an exploded perspective view of the lens-fitted film package of FIG. 22.

FIGS. 22 to 24 show another preferred embodiment of the film package according to the present invention wherein the single-element taking lens 4 is formed integrally with and as a part of a front cover section. The film package comprises a transparent front cover section 50 made of a plastic material, a light-opaque main body section 51 which opens at the back and has a 135-type film patrone 60 and a 35 mm size film roll 61 received in a film patrone receiving chamber 62 and a film roll receiving chamber 63 formed therein, and a light-tight back cover section 52 which close the back opening of the main body section 51. These elements are assembled as a unit to form a light-tight box-shaped film package. The main body section 51 and the back cover section 52 are preferably made of a lead-containing plastic material so as to shield the film against undesirable X-radiation. As is clearly shown in FIG. 23, the single-element taking lens 4 is formed integrally with and as a part of the transparent front cover section 50.

The light-tight film package is, as is shown in FIG. 23, encased tightly in an outer packaging or casing 42 which is formed with several openings therein for exposing the single-element taking lens 4, a shutter actuating member 46, a finder window 45a, a film counter 57, and a film advancing knob 65. The back cover section 52 may be fixed to the main body section 51 in any well known manner, for example by means of ultrasonic welding, so as not to be removed by the user.

In FIG. 24 showing the film package 41 disassembled into three sections, namely, the front cover section 50, the main body section 51 and the back cover section 52. The front cover section 50 has an opening extending between its back and bottom, a front wall with the single-element taking lens 4 and the finder window 45a formed therein, and a top wall with openings 46a and 47a for the shutter actuating member 46 and film counter 47 formed therein. The front cover section 50 further has at its bottom a connecting lug 56a which is fitted into an opening 56b formed in the main body section 51 to connect them together.

The main body section 51 has the film patrone receiving chamber 62 and the film roll receiving chamber 63 disposed on opposite sides of a mounting plate 58 with a shutter mechanism (see FIG. 23) mounted therein. On the top wall of the film patrone receiving chamber 62 there are the film advancing knob 55, the film counter 47b and a shutter cocking mechanism, with their associated elements.

The back cover section 52 is shaped to complementarily close the opening of the front cover section 50 extending between its back and bottom so as to provide the light-tight box-shaped film container. Inside the back cover section 52, there is a film back-up portion 67 curved so as to place the film 66 (see FIG. 23) extending between the film patrone 60 and the film roll 61 in the focal plane of the taking lens 4. The back cover section 52 is formed with a finder eye window 45b and an opening 55b for the film advancing knob 55. Shown at 68 is a breakable cover which is torn off to open a part of the bottom wall of the back cover section 52 through which the film patrone 60 can be removed without detaching the back cover section 52 from the front cover section 50. The breakable cover 68 is provided so as to simplify the operation of removing the film patrone 60 in a photo shop.

The three sections 50, 51 and 52, with their associated elements or parts, can be separately made of plastic materials and constructed as independent units. For example, the front cover section 50 is assembled with the shutter actuating member 46 in the opening 46a. The front cover section 50 thus constructed is attached to the front side of the main body section 51 with the film advancing mechanism, the film counter, a self-cocking mechanism and so forth mounted thereon.

Prior to attaching the back cover section 52 to the main body section 51 with the front cover section 50 attached thereto, the film patrone 60 and the film roll 61 are loaded in the film patrone receiving and film roll receiving chambers 62 and 63 of the main body section 51. Thereafter, the back cover section 52 is pressed against the back of the main body section 51 and secured to both of the main body section 51 and the front cover section 50 by ultrasonic welding to complete the film package. This completed film package is encased tightly in the paper or cardboard outer casing 42. If desirable, instead of encasing the film package in the outer case 42, it may be permissible to paint the front cover section 50, excluding the taking lens 4, so as to apply a colorful ornamentation to the front cover section 50.

It is advantageous to form the finder lens, as well as the taking lens 4, integrally with the transparent front cover section 50. The provision of an integral finder lens, in particular a convex finder lens, contributes to a small finder window and a neat outer appearance of the film package.

Although the present invention has been fully described by way of the preferred embodiments thereof with reference to the accompanying drawings, it is to be noted that the possibility of making various changes and modifications will be apparent to those skilled in the art. Therefore, unless otherwise such changes and modifications depart from the scope of the present invention, they should be construed as included therein.

What is claimed is:

1. A photographic film package in which a 35 mm-size photographic film, a taking lens system, and an exposure member, with their associated elements, are incorporated in a light-tight film casing as a unit, said taking lens system consisting of a single-element lens having a focal length f (mm) and an F-number defined by the following conditions:

$F \geq f^2/150$ $F \geq 34.3 - 0.75f$ $F \leq 16$

2. A photographic film package as defined in claim 1, wherein said focal length f is defined by the following condition:

$33 \leq f \leq 40$

3. A photographic film package as defined in claim 1, wherein said single-element lens is made of a plastic material.

4. A photographic film package as defined in claim 3, wherein a front part of said light-tight film casing is made of a transparent plastic material.

5. A photographic film package as defined in claim 4, wherein said single-element lens is formed integrally with said transparent front part of said light-tight film casing.

6. A photographic film package as defined in claim 5, wherein said light-tight film package is encased in an outer casing.

7. A photographic film package as defined in claim 1, wherein said photographic film is disposed in a concave focal plane.

8. A photographic film package in which a 35 mm-size photographic film, a taking lens system, and an exposure member, with their associated elements, are incorporated in a light-tight film casing as a unit, said taking lens system consisting of a single-element lens having at least one aspherical lens surface and a focal length f (mm) and an F-number defined by the following conditions:

$F \geq f^2/150$ $F \geq 34.3 - 0.75f$ $F \leq 16$

9. A photographic film package as defined in claim 8, wherein said aspherical lens surface faces forward.

10. A photographic film package as defined in claim 8, wherein said photographic film is disposed in a flat focal plane.

11. A photographic film package as defined in claim 8, wherein when said aspherical surface is defined by the following equation:

$$Z = \frac{CY^2}{1 + \{1 - (1 + k)C^2Y^2\}^{\frac{1}{2}}} + a_1Y^4 + a_2Y^6 + a_3Y^8 + a_4Y^{10}$$

where
Z is the surface sag at a distance Y from the axis of said single-element taking lens
C is a coefficient and the radius of curvature of a reference spherical surface is defined by 1/C, and
k, $a_1$, $a_2$, $a_3$ and $a_4$ are aspherical coefficients and said sag Z at a distance Y=0.3/C satisfies the following condition:

$-0.02 < Z < 0$

12. A photographic film package in which a photographic roll film and exposure means including a taking lens system and an exposure member, with their associated elements, are incorporated in a light-tight film casing as a unit, said film casing comprising:
 a main body section mounting said exposure means thereon and receiving said photographic film therein;
 a back cover section attached to said main body section to protect said photographic film light tightly; and
 a transparent front cover section provided with a single-element lens formed integrally therewith and attached to the front of said main body section.

13. A photographic film package as defined in claim 12, wherein said single-element lens is an element of said taking lens system.

14. A photographic film package as defined in claim 12, wherein said single-element lens is a finder lens.

15. A photographic film package as defined in claim 12, wherein said transparent front cover section is made of a plastic material.

16. A photographic film package as defined in claim 12, wherein said main body section and back cover section are made of a plastic material containing lead so as to shield the film against X-radiation.

* * * * *